United States Patent
Zhang

(10) Patent No.: US 7,903,120 B2
(45) Date of Patent: Mar. 8, 2011

(54) METHOD AND SYSTEM FOR SYNCHRONIZING PARALLEL ENGINES IN A GRAPHICS PROCESSING UNIT

(75) Inventor: Guofeng Zhang, Shanghai (CN)

(73) Assignee: VIA Technologies, Inc., Taipei (TW)

( * ) Notice: Subject to any disclaimer, the term of this patent is extended or adjusted under 35 U.S.C. 154(b) by 1066 days.

(21) Appl. No.: 11/581,973

(22) Filed: Oct. 17, 2006

(65) Prior Publication Data

US 2007/0091097 A1 Apr. 26, 2007

Related U.S. Application Data

(60) Provisional application No. 60/727,668, filed on Oct. 18, 2005.

(51) Int. Cl.
G06T 1/00 (2006.01)
G06T 15/00 (2011.01)
G06F 15/80 (2006.01)
G09G 5/36 (2006.01)

(52) U.S. Cl. ............................ 345/522; 345/505; 345/556

(58) Field of Classification Search .................. 345/505, 345/522, 556
See application file for complete search history.

(56) References Cited

U.S. PATENT DOCUMENTS

| | | | | |
|---|---|---|---|---|
| 4,949,280 A | * | 8/1990 | Littlefield | 345/505 |
| 4,967,374 A | * | 10/1990 | Nomura et al. | 345/502 |
| 5,801,717 A | | 9/1998 | Engstrom | |
| 5,878,216 A | * | 3/1999 | Young et al. | 709/208 |
| 5,933,155 A | | 8/1999 | Akeley | |
| 6,078,339 A | * | 6/2000 | Meinerth et al. | 345/522 |
| 6,157,395 A | * | 12/2000 | Alcorn | 345/506 |
| 6,243,107 B1 | | 6/2001 | Valtin | |
| 6,515,662 B1 | * | 2/2003 | Garland | 345/427 |
| 6,724,390 B1 | * | 4/2004 | Dragony et al. | 345/543 |
| 6,747,654 B1 | * | 6/2004 | Laksono et al. | 345/502 |
| 6,828,975 B2 | * | 12/2004 | Noyle | 345/522 |
| 7,015,915 B1 | * | 3/2006 | Diard | 345/522 |
| 7,095,416 B1 | * | 8/2006 | Johns et al. | 345/522 |
| 7,522,167 B1 | * | 4/2009 | Diard et al. | 345/502 |
| 2003/0128216 A1 | * | 7/2003 | Walls et al. | 345/506 |
| 2003/0169269 A1 | * | 9/2003 | Sasaki et al. | 345/581 |
| 2005/0041031 A1 | | 2/2005 | Diard | 345/505 |

* cited by examiner

Primary Examiner — Kee M Tung
Assistant Examiner — Robert Craddock
(74) Attorney, Agent, or Firm — K&L Gates LLP

(57) ABSTRACT

A method and system are disclosed for synchronizing two or more engines in a graphics processing unit (GPU). When issuing a command to an engine, a central processing unit (CPU) writes an event value representing the command into an element of an event memory associated with the engine. After executing the command, the engine modifies the content of the event memory in order to recognize the completion of the command execution. The CPU acquires the command execution status by reading the modified content of the event memory. With precise knowledge of the command execution status, the CPU can issue commands to various engines independently, hence the engines can run parallel.

16 Claims, 2 Drawing Sheets

METHOD AND SYSTEM FOR SYNCHRONIZING PARALLEL ENGINES IN A GRAPHICS PROCESSING UNIT

PRIORITY DATA

This application claims the benefits of U.S. patent application Ser. No. 60/727,668, which was filed on Oct. 18, 2005, and entitled "Smart CPU Sync Technology for MultiGPU Solution."

CROSS REFERENCE

This application also relates to U.S. Patent application entitled "METHOD AND SYSTEM FOR DEFERRED COMMAND ISSUING IN A COMPUTER SYSTEM", U.S. Patent Application entitled "TRANSPARENT MULTI-BUFFERING IN MULTI-GPU GRAPHICS SUBSYSTEM", and U.S. Patent Application entitled "EVENT MEMORY ASSISTED SYNCHRONIZATION IN MULTI-GPU GRAPHICS SUBSYSTEM", all of which are commonly filed on the same day, and which are incorporated by reference in their entirety.

BACKGROUND

The present invention relates generally to computer graphics subsystems, and, more particularly, to the synchronization of various parallel engines inside a graphics processing unit.

A graphics processing unit, or GPU, is a dedicated graphics processing device in a computer system or game console. It is a common practice for a GPU to contain several parallel processing structures, or engines, to carry out dedicated functions in order to improve GPU's performance. For instance, 3D engine only provides real-time 3D rendering. Other engines include 2D engine and master-image-transfer (MIT) engine, etc.

Even though these engines can run independently, they often lack adequate synchronization mechanisms among themselves in traditional computer systems, i.e., after an engine finishes a task, it has no mechanism to provide a notification of such an event. To facilitate a switch from one engine to another, the central processing unit, or CPU, has to insert a wait-engine-idle command, which blocks commands for other engines, hence hinders the engines to run fully parallel.

Such issues become a performance bottleneck especially in multi-GPU and multi-buffer applications. For instance, assuming there is a master GPU and one or more slave GPUs associated therewith, and in the slave GPU, after a 3D engine finishes a frame rendering, its master-image-transfer (MIT) engine begins to bit-block-transfer (BLT) the frame to a master GPU buffer. Ideally the 3D engine should be able to render a next frame right after the current rendering finishes, but without the proper synchronization mechanism, the 3D engine has to wait for the MIT engine to complete its BLT before proceeding to the next frame rendering. Here the term, "master GPU", refers to a GPU having a direct connection to a display driver. The term, "slave GPU", refers to a GPU that has no direct connection with the display driver and has to transfer its rendered image to the master GPU for display.

It is therefore desirable for a computer system to have synchronization means to allow various engines inside a GPU to run parallel to improve efficiency.

SUMMARY

In view of the foregoing, a method and system are disclosed for synchronizing two or more engines in a graphics processing unit (GPU) to allow the engines to run parallel.

According to one embodiment of the present invention, when issuing a command to an engine, a central processing unit (CPU) writes an event value corresponding to the command into an element of an event memory associated with the engine. After executing the command, the engine modifies the content of the event memory in order to recognize the completion of the command execution. The CPU acquires the command execution status by examining the modified content of the event memory. With the precise knowledge of the command execution status, the CPU can issue commands to various engines independently, hence the engines can run parallel.

The construction and method of operation of the invention, however, together with additional objects and advantages thereof will be best understood from the following description of specific embodiments when read in connection with the accompanying drawings.

DESCRIPTION

A method and system are disclosed below for synchronizing two or more engines in a graphics processing unit (GPU) in a computer system to allow the GPU to improve its efficiency. Detailed information with regard to the operation of the GPU in the computer system is further described in U.S. Patent application entitled "METHOD AND SYSTEM FOR DEFERRED COMMAND ISSUING IN A COMPUTER SYSTEM", and U.S. Patent Application entitled "TRANSPARENT MULTI-BUFFERING IN MULTI-GPU GRAPHICS SUBSYSTEM", and U.S. Patent Application entitled "EVENT MEMORY ASSISTED SYNCHRONIZATION IN MULTI-GPU GRAPHICS SUBSYSTEM", all of which are commonly filed on the same day, and which are incorporated by reference in their entirety.

Figure 1:
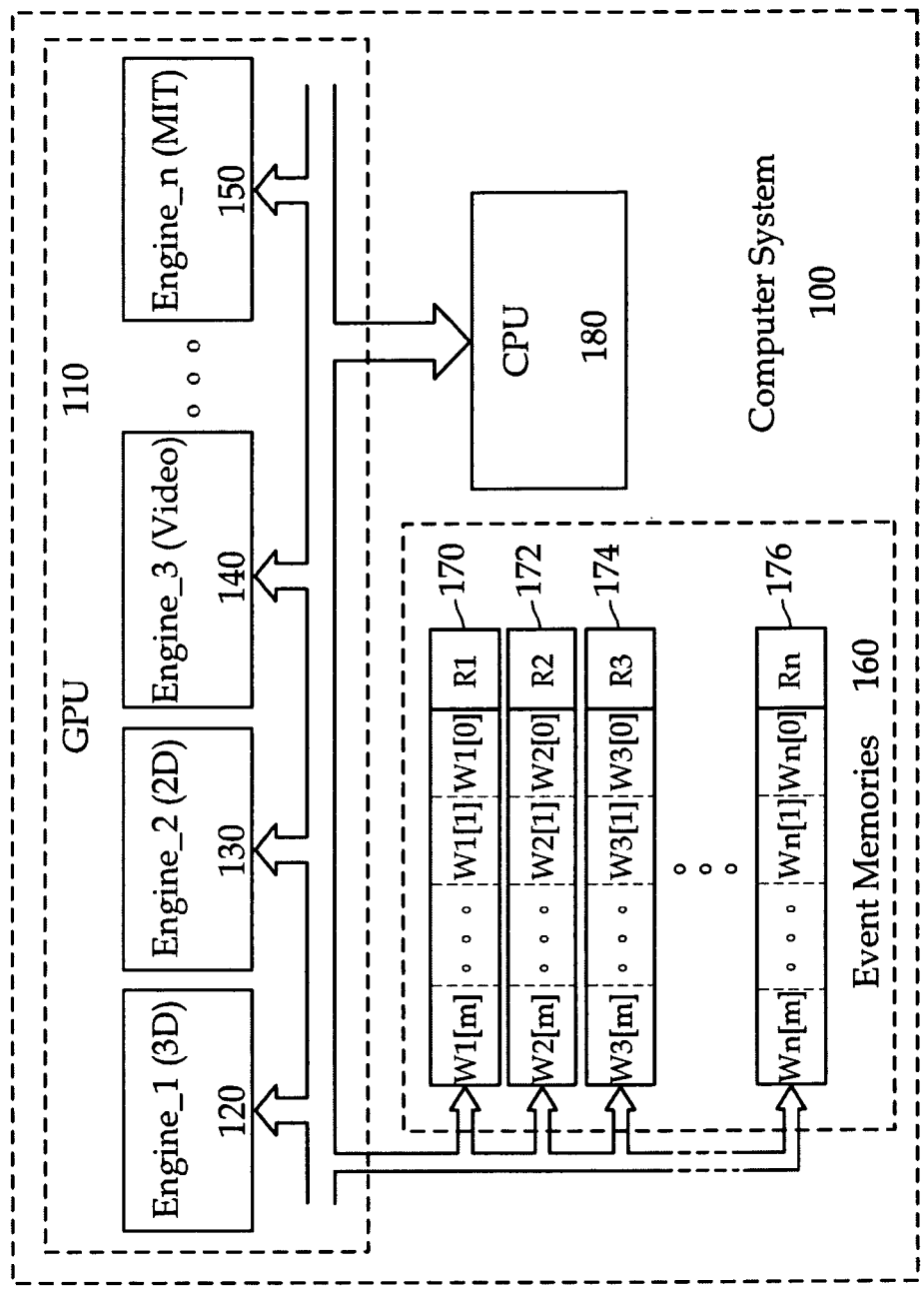
FIG. 1 is a block diagram of a part of a computer system with allocated event memories for event tracking.

FIG. 1 is a block diagram of a part of a computer system 100 that has a graphics processing unit (GPU) 110. Inside the GPU 110, there is number of engines for various tasks, such as 3D rendering engine 120, 2D graphics engine 130, video processing engine 140 and master-image-transfer (MIT) engine 150. A set of event memories 160 are allocated from either PCI Express or video memory or some other memory space for storing the GPU engine event status. The event memories 160 have n number of memories 170 through 176 with each one dedicated to a particular engine. For instance, event memory 170 is for the 3D engine 120, event memory 172 is for the 2D engine 130, event memory 174 is for the video engine 140 and event memory 176 is for the MIT engine 150. Within each event memory, there are various elements. For example, as shown in FIG. 1, there are m+1 number of elements, with a particular one dedicated as a read element, such as R1 in event memory 170, and the rest m elements are write elements, such as W1[0:m−1] in event memory 170. Every time when an engine command needs to be traced, and upon issuing of the command to the engine, the CPU writes a predetermined value corresponding to the command into a write-element of an event memory for that engine and let the engine copy the value in the write-element to a read-element of the same event memory. By checking the read-element alone, the CPU is aware of the completion of the command execution. Note that if the engine does not have a COPY command, it is the driver's duty to let each engine do the COPY action. E.g. driver can let MIT engine do MIT to do the COPY, or let 2D engine do a bitBlt to do the COPY, or let 3D engine use the write memory as a texture and the read memory as a render target to do a render to do the COPY.

Figure 2:
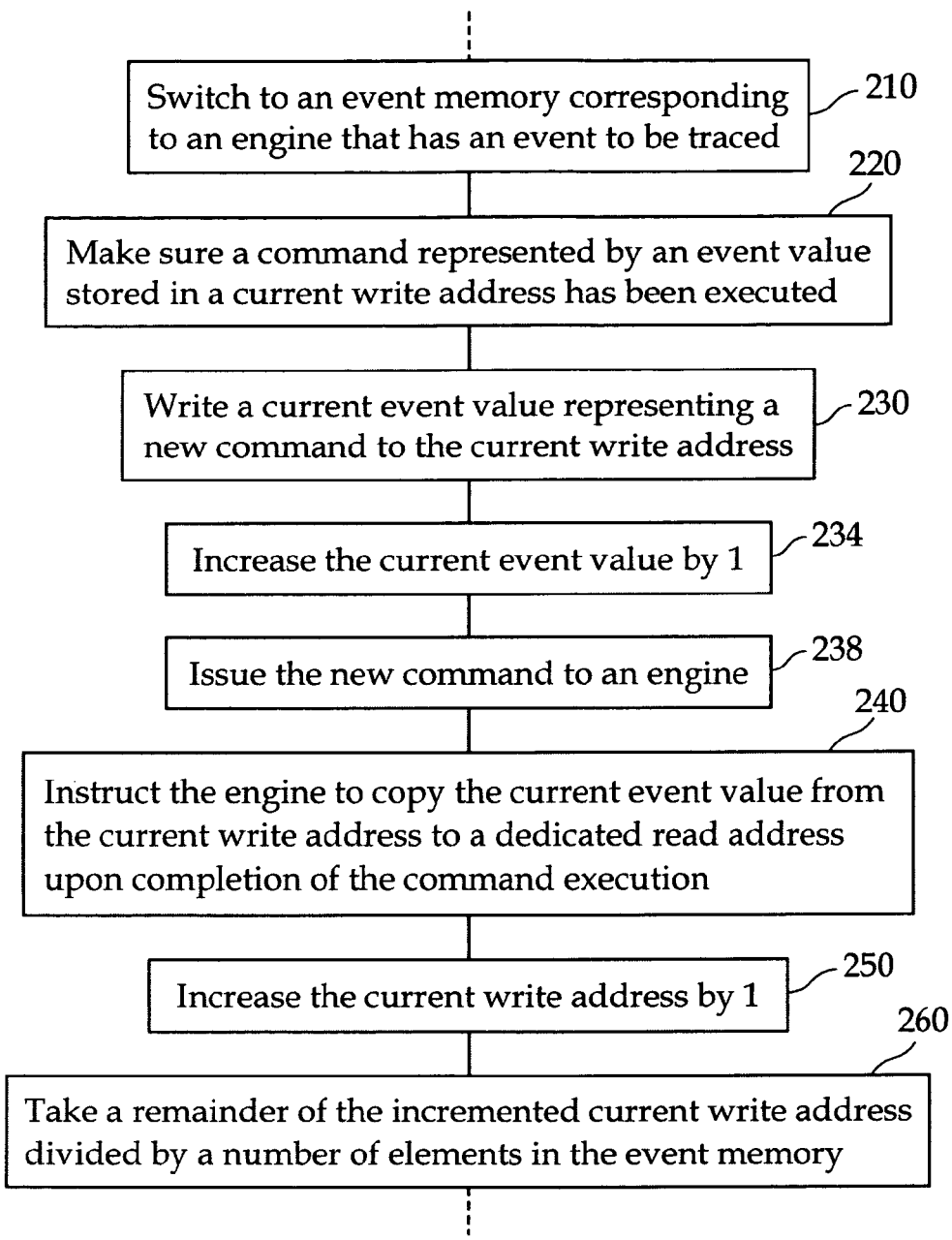
FIG. 2 is a flow chart illustrating the operations of the event memory updating and command issuing.

FIG. 2 is a flow chart detailing the command status recording and checking operations for the computer system shown in FIG. 1. Referring to both FIGS. 1 and 2, the CPU 180 first directs its attention to an event memory associated with an engine inside a GPU that has a command in need of tracing in step 210. In step 220 the CPU 180 has to make sure that a command represented by an event value stored in a current write address has been executed. For example, W1[0:m−1] is checked first if the value stored there is associated with a command being traced. The following is a pseudo-code for a program that will be explained with regard to FIG. 2:

waiting for event(curEventValu+1−m)
WriteElement[curWriteAddress]=curEventValu++
curWriteAddress++
curWriteAddress %=(m)

According to an embodiment of the present invention, assuming event values representing particular engine commands are incrementally assigned, and curEventValu stands for a current event value, and m is the number of write-elements in the event memory, then event (curEventValu+1−m) corresponds to a command issued m number of command cycle earlier. Step 220 can be expressed as: waiting for event (curEventValu+1−m) is completed.

Step 220 is added because of the limited number (m) of the write-elements in the event memory, and the need to prevent a value associated with an unexecuted command in the event memory from being overwritten. Alternatively, if the number m is sufficiently large so that the chance of overwriting values for unexecuted commands is so slim that it can be ignored, then the step 220 can be skipped. Similarly, the number of write-elements can also be dynamically assigned in order to avoid the danger of unexpected overwriting, and this step 220 can also be eliminated.

Next step 230 in FIG. 2 is to write the current event value (curEventValu), associated with a new command, to the current write address (curWriteAddress) of the event memory, and then increase the curEventValu by one in step 234. These steps can be expressed as: *WriteElement[curWriteAddress] =curEventValu++.

In step 238 the CPU 180 issues the new command to an engine, and instructs the engine to modify the content of the designated event memory. For instance, it may instruct the engine to copy the value in the write element at the address, curWriteAddress, to a dedicated read element upon finishing the execution of the command in step 240. After executing the command, this particular engine does the copying as instructed without any participation by CPU 180. Alternatively, the CPU can also instruct the content of the designated event memory to be changed to a particular predetermined value.

Step 250 is to increase the current write address, or curWriteAddress, by one for this particular engine. The expression for step 250 is: curWriteAddress++.

Step 260 is to take a remainder of the incremented current write address divided by the number of write-elements, or m. The purpose of this step is that when the curWriteAddress is increased larger than m, it will be reset to the beginning as there are only m numbers of write addresses. Step 260 can also be expressed as: curWriteAddress %=(m).

The CPU can quickly check the read element of the designated memory space, and in this way, every time when the CPU examines the value of a read element, it can exactly know which engine has finished a command execution.

As shown, for synchronizing two or more engines in a graphics processing unit, an event value representing a command issued to an engine is written into an element of an event memory, such as the write element. The content of the event memory containing the event value may be modified recognizing a completion of the command execution by the engine. The modified content of the event memory is then read by a central processing unit to acquire the command execution status, wherein the CPU coordinates command issuing to all the engines based on the command execution status of each engine.

This invention provides many different embodiments, or examples, for implementing different features of the invention. Specific examples of components and methods are described to help clarify the disclosure. These are, of course, merely examples and are not intended to limit the disclosure from that described in the claims.

What is claimed is:

1. A method for synchronizing two or more engines in a graphics processing unit (GPU), the method comprising:
    issuing a command by a central processing unit (CPU) to an engine of the two or more engines within the GPU, wherein the two or more engines are parallel processing structures configured to carry out dedicated functions;
    writing an event value by the CPU into at least one write element of an event memory associated with the engine that has an event to be traced, the event value corresponding to a command execution status;
    modifying by the engine a content of the event memory containing the event value upon completing execution of the command by the engine; and
    reading the modified content of the event memory by the CPU to acquire the command execution status, wherein the CPU coordinates command issuing to all the engines based on the command execution status of each engine.

2. The method of claim 1, wherein the writing further includes allocating the element of the event memory dynamically.

3. The method of claim 1, wherein the writing further includes checking the event memory prior to writing the event value to avoid overwriting another event value representing another command not yet executed.

4. The method of claim 1, wherein the modifying further includes copying the event value representing an executed command to a dedicated element for the CPU to read.

5. The method of claim 1, wherein the modifying further includes replacing the event value with a new predetermined event value.

6. The method of claim 5, wherein the modifying further includes writing the new event value to a dedicated element for the CPU to read.

7. The method of claim 1 further comprising managing the event memory to avoid overflow.

8. A method for synchronizing two or more engines in a graphics processing unit (GPU), the method comprising:
    issuing a command by a central processing unit (CPU) to an engine of the two or more engines within the GPU, wherein the two or more engines are parallel processing structures configured to carry out dedicated functions;
    writing an event value by the CPU into at least one write element of an event memory associated with the engine that has an event to be traced, the event value corresponding to a command execution status;

copying by the engine the event value in the event memory to at least one read element of the event memory upon completing execution of the command by the engine; and reading the event value from the read element by the CPU to acquire the command execution status, wherein the CPU coordinates commands issuing to all the engines based on the command execution status of each engine.

9. The method of claim 8, wherein the writing further includes allocating the write element of the event memory dynamically.

10. The method of claim 8, wherein the writing further includes checking the event memory prior to writing the event value to avoid overwriting another event value representing another command not yet executed.

11. The method of claim 8, further comprising replacing the event value with a new predetermined event value upon completion of the execution of the command.

12. The method of claim 8 further comprising incrementing the event value for a next command after writing the event value for a current command.

13. The method of claim 8 further comprising managing the event memory to avoid overflow.

14. A computer system comprising:

at least one central processing unit (CPU);

at least one graphics processing unit (GPU) with two or more engines contained therein, wherein the two or more engines are parallel processing structures configured to carry out dedicated functions; and at least one event memory associated with each engine, the event memory having at least one write element for recording event values, wherein the CPU writes an event value representing a command issued to a predetermined engine into the at least one write element of the event memory associated the predetermined engine that has an event to be traced, and the predetermined engine modifies a content of the associated event memory containing the event value upon completing execution of the command, and wherein the CPU reads the modified content of the memory to acquire a command execution status, and coordinates command issuing to all the engines based on the command execution status of each engine.

15. The computer system of claim 14, wherein the event value is recorded in the at least one write element of the event memory until the command is executed.

16. The computer system of claim 14, wherein the event memory further includes one or more read elements for receiving an event value at the completion of the command execution.

* * * * *